J. A. ADKINS.
SCRAPER ATTACHMENT FOR PLOWS.
APPLICATION FILED JUNE 18, 1917.
1,256,090. Patented Feb. 12, 1918.
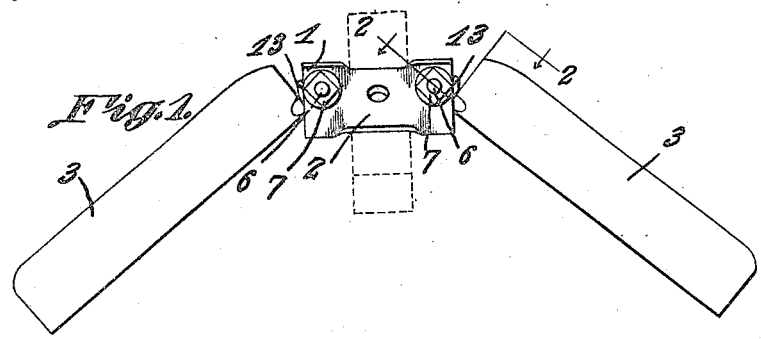
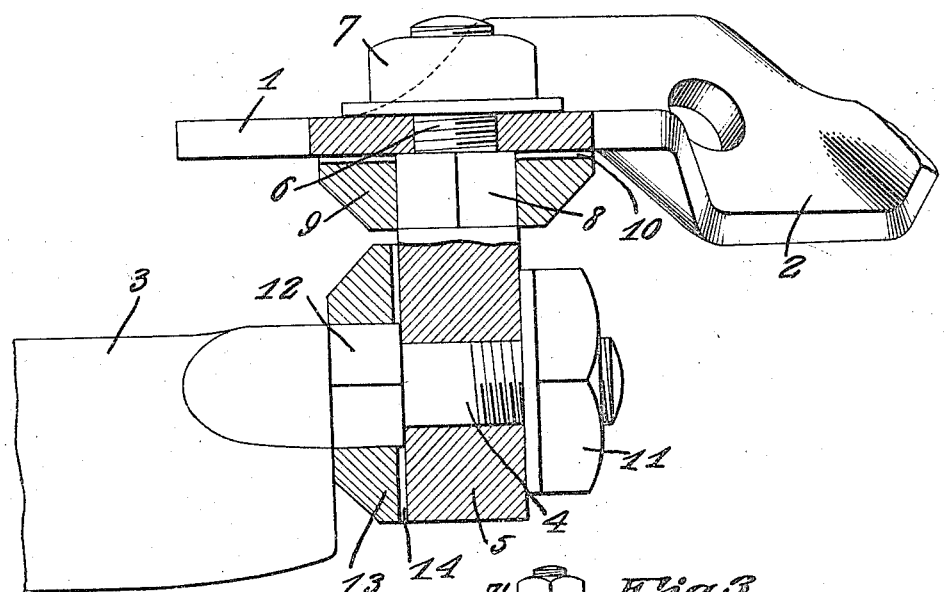
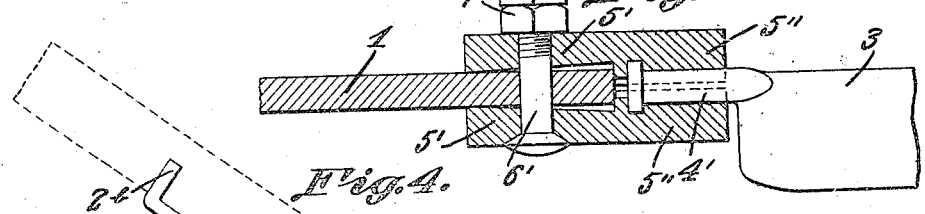
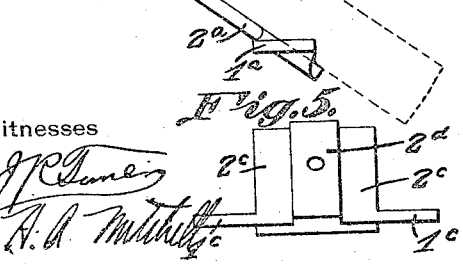
J. A. Adkins, Inventor
Witnesses
by
Attorneys

UNITED STATES PATENT OFFICE.

JAMES A. ADKINS, OF VIENNA, GEORGIA.

SCRAPER ATTACHMENT FOR PLOWS.

1,256,090.

Specification of Letters Patent. Patented Feb. 12, 1918.

Application filed June 13, 1917. Serial No. 175,464.

*To all whom it may concern:*

Be it known that I, JAMES A. ADKINS, a citizen of the United States, residing at Vienna, in the county of Dooly and State of Georgia, have invented a new and useful Scraper Attachment for Plows, of which the following is a specification.

The present invention relates generally to plows and more especially to a scraper attachment for plows, it being the object of the invention to provide a simple and inexpensive scraper attachment of novel and improved construction, which can be applied to various plows for scraping the ground at the opposite sides of the plow point.

A further object of the invention is the provision of novel and improved means for adjustably mounting the scraper blades for adjustment about vertical axes as well as about their longitudinal axes, in order that the rearward angle of the blades can be adjusted and the blades tilted laterally of themselves, according to the various conditions.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is a plan view of the attachment.

Fig. 2 is an enlarged section on the line 2—2 of Fig. 1.

Fig. 3 is a sectional view of a modification.

Fig. 4 is a side elevation of a modified form of attaching member.

Fig. 5 is a front view of still another modified form of attaching member.

Referring to Figs. 1 and 2, the attachment illustrated therein embodies an attaching member or plate 1 disposed transversely and having its end portions or wings in a substantial horizontal plane, while the intermediate portion 2 of said plate 1 is twisted into a rearwardly inclined position and apertured to be bolted to the rear or under side of the plow standard, as will be readily understood. The forward end of the portion 2 is below the plane of the wings or end portions of the plate 1, while the rear end thereof is above said plane. Thus, when the portion 2 is secured to the plow standard, the wings will project from the opposite sides thereof in a common horizontal plane. The scraper blades 3 are of elongated form, and project away from one another, having their forward edges sharpened, and the blades are provided at their adjacent ends and adjacent to their rear edges with shanks 4 extending pivotally through the depending eyes 5 of upstanding bolts 6 projecting through apertures in the wings of the plate 1. Nuts 7 are threaded upon the bolts 6 and seated on the wings of the plate 1 to clamp the bolts 6 in place, said bolts having square or non-circular portions 8 above the eyes 5 and below the plate 1 on which are fitted washers 9 having non-circular openings, to prevent their relative rotation upon said bolts. The washers 9 and plate 1 can have interengageable radial corrugations 10, to prevent the bolts 6 from turning when the nuts 7 are tightened to clamp the washers 9 against the under side of the plate. A nut 11 is threaded upon each shank 4 and bears against that side of the eye 5 opposite to the blade, said shank having a square or non-circular portion 12 upon which is non-rotatably fitted a washer 13 bearing against the opposite side of the eye 5, said washer 13 and eye having interengageable radial corrugations 14, to prevent the blade from turning about the axis of the shank 4 when the nut 11 is tightened.

From the foregoing, it will be apparent that when the nuts 7 are loosened, the blades 3 can be swung about the vertical axes of the bolts 6, to swing the blades forwardly and rearwardly, whereby they can be disposed transversely in alinement or at a suitable rearwardly extending position. By loosening the nuts 11, the blades 3 can be swung transversely of themselves about the axes of the shanks 4, whereby the blades can be brought into a substantially horizontal plane, or can be inclined transversely thereof more or less by raising and lowering their forward edges. A double adjustment for the blades is thus provided, since they can be swung forwardly and rearwardly and held in various positions, and the blades can be swung about axes longitudinally thereof to control their action on the soil, as desired.

Fig. 3 illustrates a modification, wherein one bolt 6' holds the blade for both of its adjustments, said bolt 6' extending vertically through the plate 1 and having a nut 7' thereon. A clamp embodying upper and lower sections 5' pivotally engages the bolt 6' and is provided with jaws 5" beyond the end of the plate 1 pivotally receiving the shank 4' of the blade 3, said shank having a head seated in notches or seats in the jaws 5", to prevent the withdrawal of the shank 4' from the clamp, but to enable said shank to turn therein when the bolt 6' is loosened. When the nut 7' is loosened, the shank 4' is loosened between the jaws 5", thereby enabling the blade 3 to be turned on its axis, and the blade can also be swung with the clamp about the vertical axis of the bolt 6', thus providing a double adjustment. When the bolt and nut are tightened, this causes the clamp sections to engage the plate 1 and hold the clamp in its adjusted position, and the jaws 5" are also forced together to grip the shank 4' and hold the blade in its adjusted position with respect to the clamp.

Fig. 4 illustrates a modified form of attaching member embodying the plate 1ª having the inclined portion 2ª with an upturned rear terminal 2ᵇ to extend into the plow standard.

Fig. 5 illustrates another form of attaching member embodying a block 2ᶜ having the outstanding ears 1ᶜ for the connection of the blades, said block 2ᶜ having an upstanding rib 2ᵈ to engage the plow standard and prevent the block 2ᶜ from turning.

Having thus described the invention, what is claimed as new is:

1. A scraper attachment for plows embodying an attaching member having intermediate means for attachment to a plow standard, members connected to the attaching member at opposite sides for rotary adjustment about vertical axes, and scraper blades having adjacent ends connected to the last mentioned members for rotary adjustment about longitudinal axes.

2. A scraper attachment for plows embodying an attaching member having intermediate means for attachment to a plow standard, members connected to the attaching member at opposite sides for rotary adjustment about vertical axes, scraper blades having adjacent ends connected to the last mentioned members for rotary adjustment about longitudinal axes, and means for clamping the last mentioned members and blades in various adjusted positions with respect to each other and the attaching member.

3. A scraper attachment for plows embodying an attaching member having intermediate means for attachment with a plow standard, a pair of members connected with the attaching member at opposite sides of said portion for rotatable adjustment about vertical axes, scraper blades projecting away from each other and having shanks at their adjacent ends engaged with the last mentioned members for rotatable adjustment, and means for clamping the last mentioned members to the attaching member for clamping said shanks to the last members.

In testimony that I claim the foregoing as my own, I have hereto affixed my signature in the presence of two witnesses.

JAMES A. ADKINS.

Witnesses:
  IVY E. SIMPSON,
  PHILOMENA A. ROCKELLI.

Copies of this patent may be obtained for five cents each, by addressing the "Commissioner of Patents, Washington, D. C."